United States Patent Office 3,441,523
Patented Apr. 29, 1969

3,441,523
FILLED CELLULAR URETHANES
Frank J. Dwyer and Richard J. Herdlein, Buffalo, N.Y., assignors to Allied Chemical Corporation, New York, N.Y., a corporation of New York
No Drawing. Filed Nov. 12, 1964, Ser. No. 410,752
Int. Cl. C08g 22/46, 22/14, 51/02
U.S. Cl. 260—2.5                                           6 Claims This invention relates to novel urethane compositions. More particularly, it relates to filled flexible cellular urethanes which possess excellent physical properties and are eminently suitable for use in cushioning articles and the like.

Cellular urethanes are prepared by reacting, in the presence of a blowing agent, polyisocyanates with active hydrogen containing substances such as polyesters, including polyester amides, and hydroxyl containing polyethers including polyether diols and triols. Usually catalysts, such as organo-tin compounds and tertiary amines, and emulsifiers, such as silicone oils, are incorporated in the reaction mixture to control reaction rate, cell size, and porosity. The addition of fillers such as barium sulfate, kaolin, wood cellulose, and the like, to the foamable mass, in order to increase density, load bearing character and/or to serve as nucleating agents, likewise is conventional in this art. The use of fillers which in the present instance includes pigments such as titanium dioxide, cadmium selenides, Hansa Yellows and phthalocyanines, serves not only to increase density, etc. but also usually decreases such important physical properties as tensile strength, elongation, tear strength, "feel" or "hand." This deterioration of physical properties is roughly proportional to the amount of filler used. Further, fillers, while increasing the load capacity at high deflections, likewise increases this property at low deflections, so that the ratio is close to unity. This ratio, known as the "SAC" or "SAG" factor and generally expressed as the ratio of the indentation load deflection ("ILD") at 65% to 25% deflection (ASTM D–1564–59T), is a measure of support provided by the cushioning material when in use. A "SAG" factor close to unity is said to "bottom out" or to provide little or no resistance while a "SAG" factor of about 2 or more is said to provide sufficient "fight back" to be satisfactory for use as cushioning material in such as automobile seat topper pads, furniture cushions, and mattresses.

It is therefore, a principal object of this invention to provide novel filled cellular urethanes.

Another object is to devise a process for the preparation of such novel cellular urethanes.

Other objects and advantages will be apparent from the following description of our invention.

We have made the surprising discovery that novel flexible cellular urethanes with improved elongation and tear strength and having a satisfactory tensile strength and SAG factor and other excellent properties can be obtained by a one-shot process comprising admixing the following materials:

(a) A diisocyanate;
(b) A mixture of polyether polyols consisting essentially of about 50% to about 90% by weight of a polyoxyalkylene triol having a molecular weight of about 1000 to about 5000 and a hydroxyl number of about 30 to about 170 and about 10% to about 50% by weight of a polyoxyalkylene diol having a molecular weight of about 1000 to about 3000 and a hydroxyl number of about 40 to about 110, said mixture having a primary hydroxyl group content of about 10% to about 65%;
(c) A particulate filler, which is at least 5% by weight of the materials used herein, the particles of said filler being less than about 50 microns in the largest dimension; and
(d) Water.

The resultant novel cellular structures are characterized by having not only a satsfactory "SAG" factor and tensile strength, but improved tear strength and especially high elongation. Consequently, the novel structures can be shaped by molding in intricate patterns or formed from slabstock by fabricating into cushions of a desirable high degree of utility, comfort and permanence.

Additionally, the novel urethane structures, containing a relatively large amount of filler without depreciation of any important physical characteristic, possess an economic advantage over the unfilled structures since by virtue of their higher density, the cost per pound of the filled foams is significantly lower than the analogous unfilled foams.

The filler used may be any finely divided solid which is substantially insoluble in, and non-reactive with, the other components of the composition. As typical examples of the fillers which may be used in these formulations the following are mentioned:

aluminum silicate
calcium carbonate
barium sulfate
kaolin
wood cellulose
copper phthalocyanine
cadmium selenide
carbon black
silica
titanium dioxide (anatase and rutile forms)
mica
organic resins and polymers, e.g. polystyrene, polyvinyl acetate
iron oxides Mixtures of these and equivalent substances are contemplated also.

The particle size of the filler can vary over a considerable range but must be below about 50 microns in the largest dimension. Preferably the range of from about 2 to 25 microns describes the most convenient particle size to handle. Different fillers and different methods of dispersing the fillers will, as will be obvious to those skilled in this art, produce different results. For example when using barium sulfate of an average particle size of about 6 microns, the cellular urethane produced when a Lightnin mixer was used to disperse the filler was slightly less dense and had slightly inferior physical properties than the analogous urethane produced using a high shear mixer, e.g. a Cowles mixer, to disperse the filler in the polyether polyol component.

The amount of filler incorporated in the novel cellular urethane structures of our invention must be at least about 5% by weight of the total weight of the materials used to prepare the cellular urethane. A preferred range is about 20% to about 60% by weight.

Any of a wide variety of diisocyanates or mixtures thereof, can be used in this novel process. The liquid diisocyanates are preferred. As examples of this component the following are mentioned:

m-Phenylene diisocyanate
2,4-tolylene diisocyanate
2,6-tolylene diisocyanate
Naphthalene-1,5-diisocyanate
Naphthalene-1,8-diisocyanate
4,4'-methylene-bis-(phenylisocyanate)
4,4'-methylene-bis-(tolylisocyanate)
4,4'-methylene-bis-(cyclohexylisocyanate)
1,6-hexamethylene-diisocyanate A general discussion of isocyanates and their preparation can be found in Saunders et al., cited infra, pp. 17–32.

Mixtures of the above and equivalent materials and tolylene diisocyanates such as those disclosed in French Patent No. 1,375,975 are contemplated.

The amount of diisocyanate used is that generally sufficient to react with the hydroxyl groups of the polyol used and with the water, if used, to generate carbon dioxide for blowing the mixture. This amount can be such as to provide a ratio of NCO:OH groups within the range of 0.9 to 1.5:1. The preferred NCO:OH ratio is 1.0:1 to 1.2:1.

The active hydrogen-containing component which is reacted with the polyisocyanate in the process of our invention is a mixture of polyoxyalkylene triols and polyoxyalkylene diols. Such compounds are believed to have essentially the following formula:

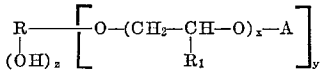

wherein R is the residue of a polyol as exemplified below; $R_1$ is H or methyl, $x$ is an integer from 5 to 50, $y$ is an integer 2 or 3, A is H, a 2-hydroxyethyl group, or a 3-hydroxy propyl group and $z$ is an integer 0 or 1. Such polyether polyols can be obtained in a known manner by condensation of an alkylene oxide such as ethylene oxide, 1,2 propylene oxide, 1,3 propylene oxide or mixtures thereof with polyhydric alcohols such as ethylene glycol, propylene glycol, dipropylene glycol, glycerin trimethylol propane, or mixtures thereof, in the presence of suitable catalysts or initiators such as trialkylamines e.g., trimethylamine, or inorganic bases e.g., potassimum hydroxide or a halide, e.g., boron trifluoride. The products resulting from condensation of mixtures of ethylene oxide and propylene oxide are preferred.

Polyether polyols prepared from ethylene oxide and a glycol or polyol may be used but such condensation products are soluble in water to a significant extent and the polymers derived therefrom are characterized by poor hydrolytic stability.

A general discussion of polyether polyols and their preparation can be found in Saunders et al., Polyurethanes, Chemistry and Technology, Part I. Chemistry, High Polymers, vol. XVI, Interscience Publishers, 1962, pp. 32–44.

Inasmuch as it is a feature of the present invention to utilize mixtures of polyoxyalkylene triols and polyoxyalkylene diols at least one of which preferably contains terminal hydroxyethylene groups and said mixture of polyols contains the requisite number of primary hydroxyl groups, we prefer to utilize a diol or triol prepared as described above using 1,2-propylene oxide or a mixture of 1,2-propylene oxide and ethylene oxide in the initial condensation and thereafter to condense ethylene oxide, in a known manner, with the resultant condensation product to provide terminal hydroxyethyl groups and primary hydroxyl groups in the desired amount.

The preferred polyoxypropylene triol contains terminal hydroxyethylene groups and has a molecular weight in the range of about 3000 to about 4500, a hydroxyl number from about 35 to about 60, and a primary hydroxyl content of about 25% to about 50%.

The preferred polyoxypropylene diol may or may not contain terminal hydroxyethylene groups and has a molecular weight in the range of 1500 to 2500, a hydroxyl number from about 45 to about 75, and a primary hydroxyl content from about 0% to about 30%.

The relative proportions of triol and diol used are preferably from about 70% to 90% (by weight) of triol and about 10% to 30% of diol. A particularly effective mixture is one consisting essentially of about 80% triol containing terminal hydroxyethyl groups and about 20% diol. The preferred primary hydroxyl content of the mixture is from about 20% to about 60%.

The primary hydroxyl (OH) content is a percentage based on the total number of OH groups in the mixture of triol and diol. Primary OH groups are those attached to a carbon atom to which two hydrogens are also attached, i.e.,

The balance of the OH groups are considered secondary hydroxyl groups.

In accordance with what is now conventional practice for producing flexible cellular urethane structures, the diisocyanate-polyol mixture can be reacted in the presence of various adjuvants such as blowing agents, activators and/or catalysts, dispersing agents or emulsifiers, and the like.

The improved cellular urethanes of our invention are primarily water-blown structures. Water by reaction with the isocyanate component generates carbon dioxide gas for the blowing and additionally forms urea groups which are believed to contribute to chain stiffeners and stability under humid aging conditions. Urea groups, on the other hand, induce hardness in the cellular structure. Auxiliary blowing agents, particularly non-reactive low boiling organic liquids, may be used to increase softness and decrease density in such products. Such liquids as methylene chloride and particularly fluorinated hydrocarbons as well as mixtures thereof can be used.

The amount of water supplied may be sufficient to generate all the $CO_2$ necessary or may be employed in lesser amount and supplemented by an auxiliary blowing agent, as noted. The amount of blowing agent can vary from about 1 part to 6 parts per 100 parts by weight of the polyol, preferably, about 2 to about 4 parts per 100 part of polyol.

Such agents are characterized by being liquids or gases at normal temperatures and pressures, poor solvents for the organic polymer and by boiilng at temperatures at or below that generated by the urethane formation reaction. The last characteristic is useful as it provides a means of reducing heat build up in the polymer forming mass. Increasing the concentration of these auxiliary agents decreases the maximum temperature within the cellular structure and increases the time to reach this maximum temperature. As typical examples of these fluorocarbons the following are mentioned: monofluorotrichloromethane; dichlorodifluoromethane; monochlorotrifluoromethane; trichlorotrifluoroethane; dichlorotetrafluoroethane; difluorotetrachloroethane; 1,1-difluoroethane; 1,1,1-dichlorofluoroethane.

Mixtures of these and equivalent blowing agents are contemplated also.

Suitable catalysts or activators for use in this invention include:

(1) Tertiary amines such as triethylamine, N-methylmorpholine, triethylenediamine, N,N,N′,N′-tetramethyl-1,3-butanediamine, soya lecithin.

(2) Organo-tin compounds of the general formula:

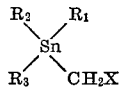

wherein $CH_2X$ represents a hydrocarbon alkane radical of 1 to 18 carbons; $R_1$, $R_2$, and $R_3$ represent a hydrocarbon alkane radical of from 1 to 18 carbons, hydrogen, halogen, or a hydrocarbon aryloxy radical, $R_1$, $R_2$, and $R_3$ being alike or different and further two members of the group of $R_1$, $R_2$, and $R_3$ together may be oxygen or sulfur. Representative members of this class of compounds include the following specific compounds:

tetramethyl tin
tetra-n-butyltin
tetraoctyltin dimethyldioctyltin
di-n-butyltindichloride
dilauryltindifluoride
2-ethylhexyltintriiodide
di-n-octyltinoxide
di-n-butyltindiacetate
di-n-butyltin-bis-(monobutylmaleate)
di-2-ethylhexyltin-bis(2-ethylhexanoate)
tri-n-butyltin-acetonate
dibutyltindistearate (3) Organic tin salts such as stannous octoate and stannous oleate.

These catalysts and/or accelerators and/or activators can be used alone or in mixtures of one or more of the several types of substances disclosed above.

Dispersing agents and/or emulsifiers conventionally used in this art include polyethylenephenolethers, blends of polyalcohol carboxylic acid esters, oil soluble sulfonates, siloxane-oxyalkylene block co-polymers and the like. The preferred adjuvants of this group in the present instance are the siloxane-oxyalkylene block copolymers of the general formula:

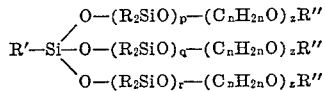

wherein R, R′, and R″ are $C_{1-18}$ alkyl radicals; $p$, $q$, and $r$ are integers from 2 to 15, and —$(C_nH_{2n}O)_z$ is a polyoxyalkylene block which is preferably a polyoxyethylene block containing from 10 to 50 of each oxyalkylene unit. Products of this type are disclosed in U.S.P. 2,834,748 and Belgium Patents 582,362–3. Such siloxane-oxyalkylene block copolymers are available commercially, one such product being offered under the trade designation of "Silicone–L–520", in which above general formula: R=$CH_3$, R′=$C_2H_5$, R″=$C_4H_9$, $p=q=r=7$ and the block

is a polyoxyethylene-polyoxypropylene block containing about 50 units of each polyoxyalkylene moiety.

The formulation, curing and application treatments of cellular urethane structures of the general class to which the novel compositions of this invention belong are well known to those skilled in the art to which these novel compositions pertain and accordingly no extended discussion of these well-known and conventional collateral aspects of the invention is deemed necessary.

The more detailed practice of this invention will be illustrated by the following examples in which parts and percentages are by weight and temperatures are given in degrees centigrade.

Example I

A. To a mixture of 80 parts of a glycerin-initiated polyoxypropylene triol containing hydroxy ethyl end groups having an average molecular weight of 3,600, a hydroxyl number of about 46, and a primary hydroxyl group content of about 47.5% and 20 parts of a propylene glycol initiated polyoxypropylene diol having substantially no primary hydroxyl groups, an average molecular weight of 2000, and a hydroxyl number of 56, are added 50 parts of Baryta White, a commercially available barium sulfate having an average particle size of 6 microns. This mixture is agitated for one hour to completely disperse the filler in the polyol blend. Thereafter the following components are mixed with the dispersion.

| | Parts |
|---|---|
| Stannous octoate | 0.25 |
| Water | 3.0 |
| Triethylenediamine | 0.15 |
| Silicone L–520 | 1.5 |

This mixture is combined with 38.3 parts of a mixture of 80 parts 2,4- and 20 parts 2,6-tolylene diisocyanate in a conventional urethane slabstock machine operating at the rate of 100 lb./min. The physical properties of the resultant urethane structure are given in Table I below.

B. The urethane structure preparation described in Part A above is repeated with the sole exception that 100 parts of the same polyoxypropylene triol are used in place of 80–20 blend of triol and diol. Physical properties of the resultant urethane structure are given in Table I below:

TABLE I

| Physical property | Foam of Part A | Foam of Part B |
|---|---|---|
| Density, pounds per cubic feet | 2.7 | 2.8 |
| Tensile strength, pounds per square inch | 13 | 15 |
| Elongation, percent | 250 | 120 |
| Tear strength, pounds per inch | 3.3 | 1.8 |
| Compression set: | | |
| 90% 22 hours, percent | 8 | 2 |
| 90% 6 hours, percent | 5 | 1 |
| Rebound at 75% penetration, percent | 48 | 40 |

These results show the surprising increase in tear strength and elongation which results from the utilization of a blend of triol and diol in the preparation of filled urethane structures over the use of the triol alone. It is noted that the tear strength and elongation of the foam of Part B of this example are below the minimum values set by the automotive industry for topper pads.

Example II

SAG factor and the effect of method of dispersion is demonstrated in the following example wherein identical mixtures of Baryta White and the polyol blend used in Example I, Part A, above, are mixed, one by a Lightnin mixer and the other in a Cowles mill, a high shear mixer. Both dispersions are mixed for about 23–30 minutes. The polyol-diisocyanate mass is, in this instance, poured into topper pad mold rather than as in the above example cast on a slabstock machine.

The complete formulation and physical properties of the resultant molded structures are given in Table II below.

TABLE II
A. Formulation

| Component | Filler dispersed by lightnin mixer (parts) | Filler dispersed by Cowles mill (parts) |
|---|---|---|
| Triol-diol blend | 100 | 100 |
| Baryta White | 50 | 50 |
| Stannous octoate | 0.15 | 0.15 |
| Triethylene diamine | 0.15 | 0.15 |
| Triethylamine | 0.1 | 0.1 |
| N-ethylmorpholine | 0.45 | 0.45 |
| Water | 2.0 | 2.0 |
| Monofluorotrichloromethane | 5.0 | 5.0 |
| Tolylene diisocyanate | 29.8 | 29.8 |
| NCO:OH index | 1.1 | 1.1 |

B. SAG factor of Molded Topper Pad

| | Filler dispersed by lightnin mixer | Filler dispersed in Cowles mill |
|---|---|---|
| Density, pounds per cubic foot | 3.3 | 3.5 |
| Indentation load deflection, pounds, at: | | |
| 25% | 37 | 40 |
| 65% | 93 | 101 |
| SAG factor | 2.51 | 2.53 |

It can thus be seen that filled flexible cellular structures having excellent physical properties have been devised and that such structures are eminently suited for use in the preparation of articles intended for use in comfort cushioning applications.

The preparation of our novel structures has been illustrated by several examples the details of which, as will be obvious to those skilled in this art can be varied over a considerable range without departing from the scope or spirit of our invention.

We claim:
1. A one-shot process for preparing flexible urethane foams comprising admixing and reacting:
   (a) an organic diisocyanate;
   (b) a mixture of polyether polyols consisting essentially of about 50% to about 90% by weight of a polyoxyalkylene triol having a molecular weight of about 1000 to about 5000 and a hydroxyl number of about 30 to about 170 and 10% to about 50% by weight of a polyoxyalkylene diol having a molecular weight of about 1000 to about 3000 and a hydroxyl number of about 40 to about 110, at least one of said polyether polyols containing terminal hydroxyethylene groups, said mixture having a primary hydroxyl group content of about 10% to about 65%;
   (c) a particulate filler which is substantially insoluble in, and non-reactive with the other components of the reaction mixture and, which is at least about 5% by weight of the materials used herein, the particles of said filler being less than about 50 microns in the largest dimension;
   (d) water; and
   (e) a catalyst.

2. A one-shot process for preparing flexible urethane foams comprising admixing and reacting:
   (a) an organic diisocyanate;
   (b) a mixture of polyether polyols consisting essentially of about 70% to about 90% by weight of a polyoxyalkylene triol having a molecular weight of about 3000 to about 4500, a hydroxyl number of about 35 to about 60, and a primary hydroxyl group content of about 25% to about 50% and about 10% to about 30% by weight of a polyoxyalkylene diol having a molecular weight of about 1500 to about 2500, a hydroxyl number of about 45 to about 75, and a primary hydroxyl content of about 0% to about 30%, said mixture having a primary hydroxyl group content of about 20% to about 60%;
   (c) a particulate filler, which is substantially insoluble in, and non-reactive with the other components of the reaction mixture and which is about 20% to about 60% by weight of the materials used herein, the particles of said filler being about 2 to about 25 microns in the largest dimension;
   (d) water; and
   (e) a catalyst.

3. A flexible urethane foam prepared by a one-shot process comprising admixing and reacting:
   (a) an organic diisocyanate;
   (b) a mixture of polyether polyols consisting essentially of about 50% to about 90% by weight of a polyoxyalkylene triol having a molecular weight of about 1000 to about 5000 and a hydroxyl number of about 30 to about 170 and 10% to about 50% by weight of a polyoxyalkylene diol having a molecular weight of about 1000 to about 3000 and a hydroxyl number of about 40 to about 110, at least one of said polyether polyols containing terminal hydroxyethylene groups, said mixture having a primary hydroxyl content of about 10% to about 65%;
   (c) a particulate filler, which is substantially insoluble in, and non-reactive with the other components of the reaction mixture and which is at least about 5% by weight of the materials used herein, the particles of said filler being less than about 50 microns in the largest dimension;
   (d) water; and
   (e) a catalyst.

4. a flexible urethane foam prepared by a one-shot process comprising admixing and reacting:
   (a) an organic diisocyanate;
   (b) a mixture of polyether polyols consisting essentially of about 70% to about 90% by weight of a polyoxalkylene triol having a molecular weight of about 3000 to about 4500, a hydroxyl number of about 35 to about 60, and a primary hydroxyl group content of about 25% to about 50% and about 10% to about 30% by weight of a polyoxyalkylene diol having a molecular weight of about 1500 to about 2500, a hydroxyl number of about 45 to about 75, and a primary hydroxyl content of about 0% to about 30% said mixture having a primary hydroxyl content of about 20% to about 60%;
   (c) a particulate filler, which is substantially insoluble in, and non-reactive with the other components of the reaction mixture and which is about 20% to about 60% by weight of the materials used herein, the particles of said filler being about 2 to about 25 microns in the largest dimension;
   (d) water; and
   (e) a catalyst.

5. The process as defined in claim 1 wherein the particulate filler is barium sulfate.

6. The urethane foam as defined in claim 3 wherein the particulate filler is barium sulfate.

References Cited

UNITED STATES PATENTS

| | | | |
|---|---|---|---|
| 3,298,976 | 1/1967 | Reinhart | 260—2.5 |
| 3,015,634 | 3/1962 | Ferrigno | 260—2.5 |
| 3,024,204 | 3/1962 | Ferrigno | 260—2.5 |
| 3,050,477 | 8/1962 | Gmitter et al. | 260—2.5 |
| 3,052,927 | 9/1962 | Hoppe et al. | 260—2.5 XR |
| 3,072,582 | 1/1963 | Frost | 260—2.5 |
| 3,137,671 | 6/1964 | Bosshard et al. | 260—37 |
| 3,150,109 | 9/1964 | Ferrigno | 260—2.5 |
| 3,194,773 | 7/1965 | Hostettler | 260—2.5 |

DONALD E. CZAJA, *Primary Examiner.*

M. J. WELSH, *Assistant Examiner.*

U.S. Cl. X.R.

260—37

UNITED STATES PATENT OFFICE
CERTIFICATE OF CORRECTION

Patent No. 3,441,523            Dated April 29, 1969

Inventor(s) Frank J. Dwyer and Richard J. Herdlein

It is certified that error appears in the above-identified patent and that said Letters Patent are hereby corrected as shown below:

Column 2, line 49 "nin" should read "nine"
Column 4, line 39 "boilinr" should read "boiling"
Column 6, line 32 "Lightnin" should read "Lightning"
Column 6, line 34 "23-30" should read "20-30"
Column 6, Table II A and B "lightnin" appearing in headings should read "lightning"
Column 7, claim 1, subsection (b), line 5, before "10%", insert -- about --.
Column 7, claim 1, subsection (b), line 11, before "10%" delete -- about --
Column 7, claim 3, subsection (b), line 5, before "10%" insert -- about --.
Column 8, claim 3, subsection (b), line 3, before "10" delete -- about --.

SIGNED AND
SEALED
MAR 10 1970

(SEAL)
Attest:

Edward M. Fletcher, Jr.
Attesting Officer

WILLIAM E. SCHUYLER, JR.
Commissioner of Patents